United States Patent
Jussila et al.

(12)

(10) Patent No.: US 6,509,502 B1
(45) Date of Patent: Jan. 21, 2003

(54) METHOD AND APPARATUS FOR PREPARING POLYANILINE

(76) Inventors: Matti Jussila, Annankatu 8, Fin-06400 Porvoo (FI), Anne Jussila, trustee; Toivo Kärnä, Kuskintie 3, Fin-06400 Porvoo (FI); Jukka Koskinen, Westendinpolku 3, Fin-02160 Espoo (FI); Ilkka Turunen, Ainonkatu 8 as. 13, Fin-53100 Lappeenranta (FI); Samuli Puhakka, Laserkatu 4 C 2, Fin-53850 Lappeenranta (FI)

( * ) Notice: Subject to any disclaimer, the term of this patent is extended or adjusted under 35 U.S.C. 154(b) by 0 days.

(21) Appl. No.: 09/709,868

(22) Filed: Nov. 10, 2000

(30) Foreign Application Priority Data

Apr. 4, 2000 (FI) .............................. 20000794

(51) Int. Cl.$^7$ ............................ C07C 211/00
(52) U.S. Cl. .................. 564/434; 528/422; 528/480
(58) Field of Search ................. 528/422, 480; 564/434

(56) References Cited

U.S. PATENT DOCUMENTS

| 5,069,820 A | 12/1991 | Jen et al. ................. 252/500 |
| 5,232,631 A | 8/1993 | Cao et al. ................ 252/500 |
| 5,276,112 A | 1/1994 | MacDiarmid et al. ....... 525/540 |
| 5,278,240 A | 1/1994 | Patil et al. ................ 525/274 |
| 5,312,686 A | 5/1994 | MacDiarmid et al. ....... 428/364 |
| 5,324,453 A | 6/1994 | Cao et al. ................ 252/500 |
| 5,436,317 A | 7/1995 | Järvinen et al. ........... 528/422 |
| 5,792,830 A | 8/1998 | Noding et al. ............ 528/422 |
| 5,928,565 A | 7/1999 | Kärnä et al. .............. 252/500 |
| 5,959,072 A | 9/1999 | Ho et al. ................. 528/422 |

FOREIGN PATENT DOCUMENTS

| EP | 0627746 | 6/1994 | ............ H01B/1/12 |
| WO | 9925753 | 5/1999 | ............ C08G/73/02 |

OTHER PUBLICATIONS

Perry's Chemical Engineers' Handbook, Robert H. Perry, pp. 18–32, McGraw–Hill (7 ed., 1997).

Primary Examiner—Samuel Barts
(74) Attorney, Agent, or Firm—Davidson, Davidson & Kappel, LLC

(57) ABSTRACT

In a method for preparing polyaniline, aniline is polymerized in a reactor in a polymerization medium containing aniline and oxidant. The polymerization is performed in a reactor in which the ratio of the heat transfer surface to the reaction volume is at least 10/m, preferably at least 20/m. In the apparatus, the polymerization is performed in a tubular reactor by allowing a medium containing aniline and oxidant to flow in a mixed flow through the tubular reactor. The tubular reactor is equipped with static mixers, and there can be several tubular reactors in parallel.

28 Claims, 8 Drawing Sheets

METHOD AND APPARATUS FOR PREPARING POLYANILINE

FIELD OF THE INVENTION

The invention relates to a method for preparing polyaniline, in which aniline is polymerized in a reactor in a polymerization medium containing aniline and oxidant. The invention also relates to an apparatus for preparing polyaniline, comprising a polymerization reactor as well as feeding means for supplying aniline, polymerization medium and oxidant into the reactor.

BACKGROUND OF THE INVENTION

Electroconductive polymers have been subject to extensive research in recent years. Polymers which show electrical conductivity due to the structure of the polymeric chain (intrinsically electroconductive polymers) provide a chance to replace metal conductors and semiconductor materials in many applications. One significant application is antistatic shielding (ESD) and electromagnetic shielding (EMI).

In the group of intrinsically electroconductive polymers, one technically promising polymer is polyaniline. Polyaniline is prepared by polymerizing an aniline monomer. The nitrogen atoms of monomer units are bonded to the para-carbon in the benzene ring of the next monomer unit. Polyaniline exists in two basic types: non-electroconductive base forms, of which the most common is emeraldine, and electroconductive salt forms which are obtained by doping the polymer with a suitable protonic acid. The polymerization method, which is the subject of this invention, can be used to produce both basic types, depending on further processing.

Polyaniline can be used in many applications which require electro-conductivity. A polyaniline which is known under the trademark PANIPOL and which is melt-processable and soluble and whose acidity is adjustable, can be used in several applications requiring electroconductivity. This polyaniline can be blended e.g. with a suitable matrix polymer by conventional blending methods used in the plastics industry, resulting in a homogeneous plastic material which maintains well its electroconductivity. Thus, the PANIPOL polyaniline is suitable for use in a variety of forms, such as

- film materials and coatings for use in packaging materials of packaging industry, components or parts of components for electronic devices, and parts for different structures;
- injection molded pieces for use in packages in electronics industry, containers suitable for the manipulation and transport of substances, casings such as casings for diskettes, components of copying machines, and pieces intended for industrial painting, shielding covers for sensitive electronic devices;
- extrusion molding products for use in pipes, pipe parts and seals for products in the form of profiles; table boards, containers and container intermediate layers for products in the form of plates and laminates; and telecommunication cables, heat cables and inner and outer layers of power cables for products in the form of cables;
- compression molding and rotational casting products for use in single pieces produced by compression molding and closed containers produced by rotational casting;
- calendering products for use in floor and wall coverings, such as plastic carpets and wallpapers;
- hot pressing and thermoforming products for use in conveyors, disposable gloves, elastoferic pieces and laminates,
- elastomers for use in conveyors, roller belts, elastomeric components for copying machines, seals and rubber-like materials;
- fibers for use in decorative materials (carpets, seat coverings and other textiles) in public rooms, vehicles, in explosion risk zones and in sterile rooms, clothing used under special conditions (headgear, footwear, work clothing), filters, dust collectors, membranes, conveyors.

In addition to the above-mentioned uses, polyaniline can be used in paints, varnishes and pigments, in corrosion protection and in parts for thermoelectric elements, accumulators or batteries.

The uses are particularly such in which antistatic shielding or EMI shielding is required, or in which electroconductive properties are otherwise useful. However, the list above is not meant to be exhaustive, and the use of polyaniline prepared by the method of the invention, or a form derived from it by further processing, is not necessarily limited to the alternatives described above.

Methods for polymerizing aniline, methods for further processing of polyaniline, and polymer properties are presented e.g. in European application publication 605 877, to which corresponds U.S. Pat. No. 5,436,317, European application publication 627 746 and U.S. Pat. No. 5,928,565. It is typical of all the known preparing methods to perform the polymerization as a batch process in a stirred tank reactor. The reaction is made by feeding a suitable oxidant, such as ammonium persulfate, into an aqueous solution of a protonic acid containing dissolved aniline in a reactor, to start polymerization. For example, according to U.S. Pat. No. 5,436,317, aniline and oxidant can be gradually fed into the aqueous solution of HCl, and the molar mass of the polymer can be influenced by the ratio of the feeding rates of aniline and the oxidant. The resulting doped polymer can be dedoped with a base to produce a non-electroconductive polyaniline product which can be re-doped with a suitable acid to produce an electroconductive polymer with the desired properties. By the selection of the re-doping acid, it is possible to influence the electro-conductive properties of the polymer.

By conventional methods, it is possible to prepare a large variety of polyaniline polymers whose properties can be adjusted according to the use. Up to date, the problem has been to control the reaction conditions to produce a polymer with a controlled uniform quality, for example a certain molecular weight distribution and/or particle size distribution.

SUMMARY OF THE INVENTION

It is an aim of the invention to present an improved preparing method whereby it is possible to better regulate the properties of polyaniline, either the non-electroconductive base form or the electroconductive form doped with an acid. To achieve this aim, the method according to the invention is primarily characterized in that the polymerization is performed in a reactor in which the ratio of the heat transfer surface to the reaction volume is at least 10/m, preferably at least 20/m. In practice, these conditions suitable for the final result are achieved e.g. in a tubular reactor by allowing a medium containing aniline and an oxidant to flow in a mixed flow through the tubular reactor. The reaction takes place preferably in a tubular reactor equipped with static mixers, wherein effective mixing is achieved. Static mixers are described in Perry's Handbook (Perry, R. H., Green, D. W., eds., Perry's Chemical Engineers' Handbook, 7$^{th}$ ed., McGrew-Hill, New York 1998, pp. 18–32 to 18–33). The disclosure of the relevant pages of the Perry's Handbook is incorporated herein by reference. The static mixers consist of stationary diverters inside the tubular reactor which force the fluid media to mix themselves through a progression of divisions and recombinations.

By the combined effect of the high ratio between the cooling surface area and the reaction volume, and the effective mixing, a polymerization temperature is achieved which is as stable as possible and controllable. The effective mixing means that the mixing time of the reactants is short in comparison with the reaction rate. The ratio between the heat transfer surface area and the reaction volume is obtained by dividing the surface area by the volume of the reaction medium, and its unit is $m^2/m^3$, i.e. 1/m.

In this invention, it has been found that the temperature control and the effective mixing are very important for the degree of uniformity of the different properties of the obtained polymer particles, i.e. they exhibit narrow distributions.

These conditions can be best achieved in a well-mixed tubular reactor in which differences in concentration are small in the area of the cross-section of the tube and there is hardly any dispersion in the axial direction. A high ratio between the heat transfer surface and the volume is obtained by a suitably small tube diameter. A high capacity can be obtained with several parallel tubes. It is also possible to achieve a high cooling surface to reaction volume ratio by installing the cooling pipe system inside the reactor tube itself. In this case, the cooling pipe system can be designed to be similar to a static mixer, where effective mixing is achieved.

As polymerization takes place in a mixed medium flowing through the tubular reactor, a homogeneous product is achieved, particularly with respect to particle size distribution and molecular weight distribution, or the distribution widths can be adjusted. The medium is effectively mixed and the conditions are uniform in the area of each cross-section perpendicular to the flowing direction. Furthermore, the polymer structure can be easily affected by changing the reaction conditions. By adjusting the temperature, particularly the length of the polymer chains can be regulated.

The method in which the polymerization takes place primarily in a tubular reactor, can be either a batch process or a continuous process. In the first mentioned case, the polymerization medium containing the reactant is circulated through the tubular reactor; in the latter case, the starting agents are supplied in a continuous flow to the tubular reactor, and the medium in which polymerization has proceeded to a certain point is taken out at the other end of the tubular reactor as a continuous flow to further processing steps.

According to yet another embodiment, at least the oxidant is fed as a separate flow to the tubular reactor. The tubular reactor makes it possible to feed the oxidant to the flow of the polymerization medium at separate consecutive points. Similarly, other starting agents can be fed more at a suitable point or at successive points, such as a dopant or a monomer or another necessary additive. Further, if the oxidation requires a catalyst, it, too, can be fed at successive points. The solution also makes it possible to feed possible polymerization termination agents at desired points. All in all, it is possible to prepare polyaniline qualities with various properties in an adjustable and controllable way. To increase the capacity, the medium can be led simultaneously through two or more tubular reactors coupled in parallel.

The apparatus according to the invention is, in turn, characterized in that the reactor is a tubular reactor to whose initial end is connected one or more inlets for feeding a polymerization medium and reactants and whose terminal end is provided with an outlet for discharging the polymerization medium and the polymer. Using a tubular reactor, the conditions can be made uniform, and the concentrations and the temperature of the reactants can be controlled at each point in the reactor. The tubular reactor can be a part of a batch reactor, wherein there is circulation between the outlet and the inlet via an intermediate container, preferably equipped with mixing, or the tubular reactor can be a part of a continuous process, wherein the outlet is connected to a line leading to further processing of the polymer. According to an advantageous embodiment, the tubular reactor is equipped with static mixers, wherein the agents are subjected to effective mixing as they flow through the tubular reactor. According to yet another advantageous embodiment, there are two or more tubular reactors coupled in parallel, wherein the capacity can be increased.

The reactor can be cooled by circulating a cooling liquid in a cooling jacket surrounding the reactor. Another alternative is to place a cooling pipe system inside the reactor tube, which cooling pipe system can be designed in the same way as a static mixer.

BRIEF DESCRIPTION OF THE DRAWINGS

In the following, the invention will be disclosed more closely with reference to the appended drawings, in which.

DETAILED DESCRIPTION OF THE PREFERRED EMBODIMENTS

Figure 1:
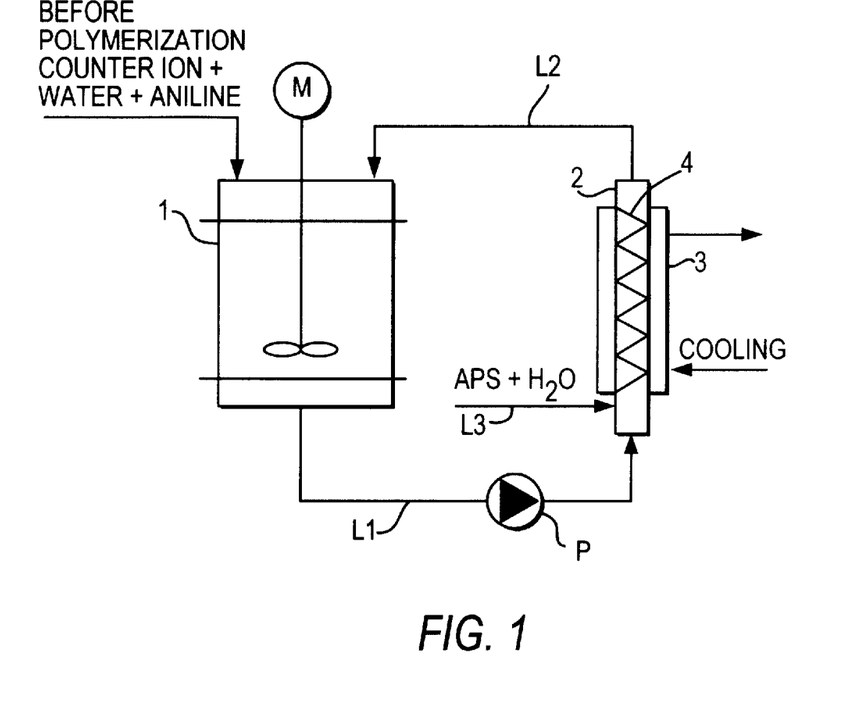
FIG. 1 shows an industrial application of the invention.

FIG. 1 shows an apparatus for preparing polyaniline doped with an acid. The parts of the device comprise a mixing tank 1 and tubular reactor 2, a closed circulation being arranged therebetween by means of a pump P. The mixing tank 1 is equipped with an agitator rotated with a motor M. A feeding line L1 extends from the mixing tank 1 via the pump P to the initial end off the tubular reactor 2, to the inlet of the reactor 2, and a return line L2 extends from the outlet of the terminal end of the tubular reactor 2 to the mixing tank 1. A feeding line L3 for an oxidant is also connected to the initial end of the tubular reactor 2, and the tubular reactor is equipped with a cooling agent circulation by making a cooling agent circulate through a jacket 3 of the tubular reactor. Static mixers inside the tubular reactor are indicated with reference numeral 4.

The process shown in FIG. 1 operates in the following way: First, an aqueous solution of protonic acid, aniline and, if necessary, other agents are added into the mixing tank 1.

Aniline can be dissolved in water for example in the mixing tank. Protonic acid makes the polymerizing medium acidic, thereby making the polymeration reaction possible. Protonic acid also acts as a so-called dopant which donates the counter anion and forms a salt with the polyaniline base. The acid used is normally sulfuric acid, but also other water-soluble protonic acids can be used.

The actual polymeration takes place by the effect of an oxidant fed into the process. Dissolved into a suitable medium, such as water, the oxidant is supplied to the initial end of the tubular reactor 2, to which the mixture of said polymerizing medium (water), protonic acid and aniline monomer is fed along the line L1. The oxidant is introduced in a suitable dose along a separate line L3 to the initial end of the tubular reactor 2. For example, peroxy compounds can be used as the oxidant. A commonly used oxidant is ammonium persulfate (denoted APS in the figures). Also other oxidants can be used. The polymeration takes place while the polymerizing medium, the aniline monomer dissolved therein and the oxidant flow through the tubular reactor 2. In the process of FIG. 1, the residence time in the tubular reactor 2 is such that polymerization is not complete, but the substances are circulated several times through the tubular reactor.

Figure 2:
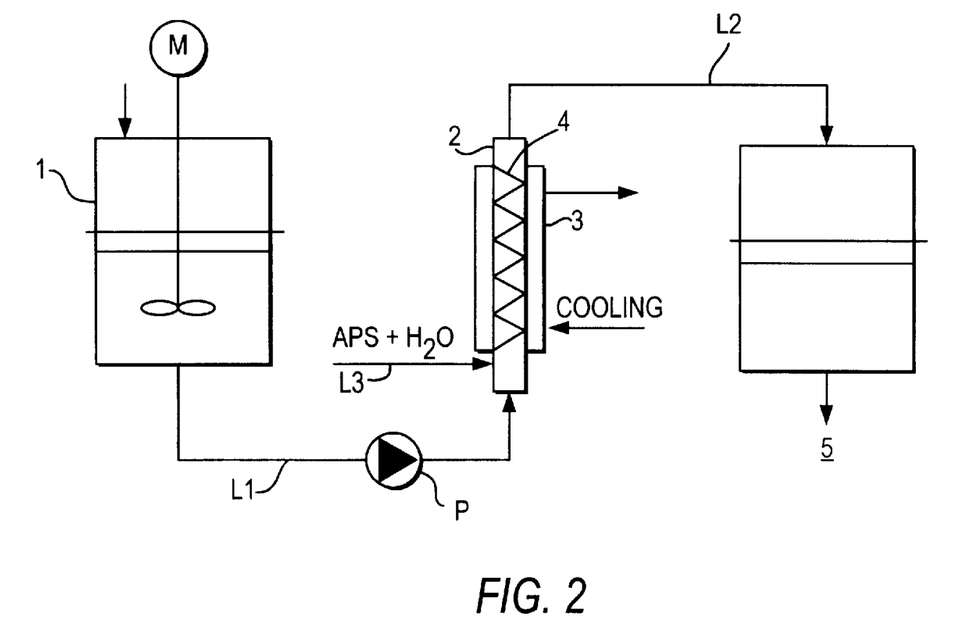
FIG. 2 shows an industrial application according to a second embodiment of the invention.

FIG. 2 shows a second feasible alternative. Here the tubular reactor 2 is part of a continuous process. From a mixing tank 1 provided with agitation and continuously supplied with water, aniline and protonic acid, a feeding line L1 extends via a pump P to an inlet in the initial end of the tubular reactor 2. At the initial end, there is also an inlet for an oxidant, to which a feeding line L3 is introduced. An outlet at the terminal end of the tubular reactor 2 is connected to a discharge line L2 for leading the polymer in form of solid particles to a separation and washing stage, which is shown schematically with reference numeral 5 in the figure. The residence time in the tubular reactor is such that after the polymerizing agent and the reactants contained in it have flown once through the reactor, the polymerization has taken place with a desired yield. Thus, the flow obtained from the tubular reactor 2 may thus still contain unreacted anilin monomer which is discharged with the filtrate and in the wash of the filtered polymer.

Figure 3:
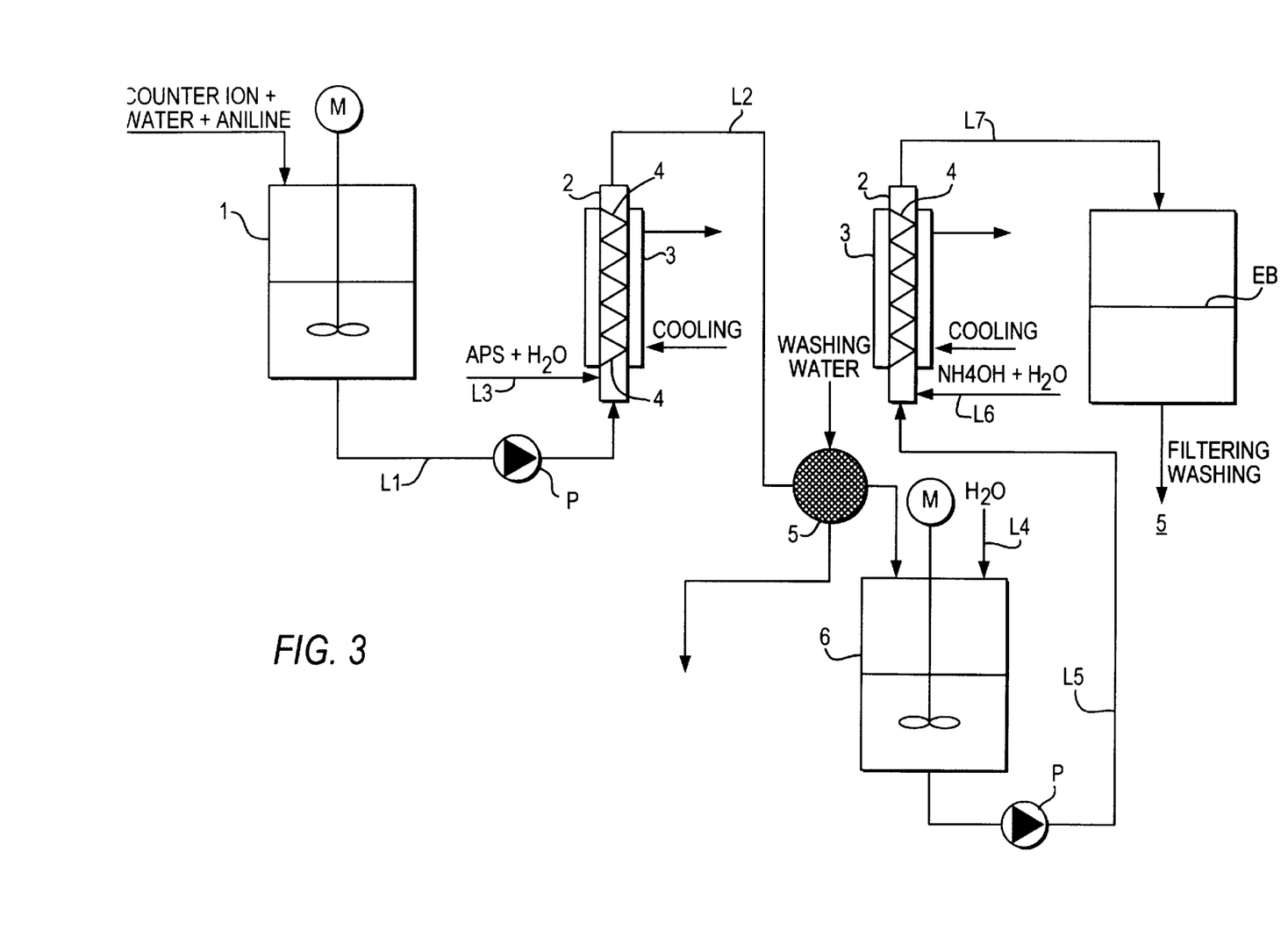
FIG. 3 shows an industrial application according to a third embodiment of the invention.

FIG. 3 shows a third embodiment suitable for industrial production. Also this involves continuous polymerization with a tubular reactor 2 equipped with static mixers 4, and the parts and their functions are, for the initial end up to the discharge line L2, the same as in FIG. 2. The polymerization is followed by aftertreatment, in which the polyaniline is converted to the base form with a suitable base in a so-called dedoping process. A discharge line L2 extends from the tubular reactor 2 via a polymer separation and washing stage 5 to an intermediate container 6 which is equipped with an agitator and to which water is added via a feeding line L4. A discharge line L5 extends from the intermediate container 6 to a second tubular reactor 2 equipped with static mixers 4. To the initial end of this tubular reactor, base supply is introduced via a line L6. The base used is normally an aqueous solution of ammonia. Also other bases, such as NaOH are possible. Also this tubular reactor 2 is equipped with cooling. The polymer dedoped to the base form is led from the terminal end of the tubular reactor 2 along a discharge line L7 to the polymer separation and washing stage 5 again, in which the polymer in alkaline form can be separated and washed.

Figure 4:
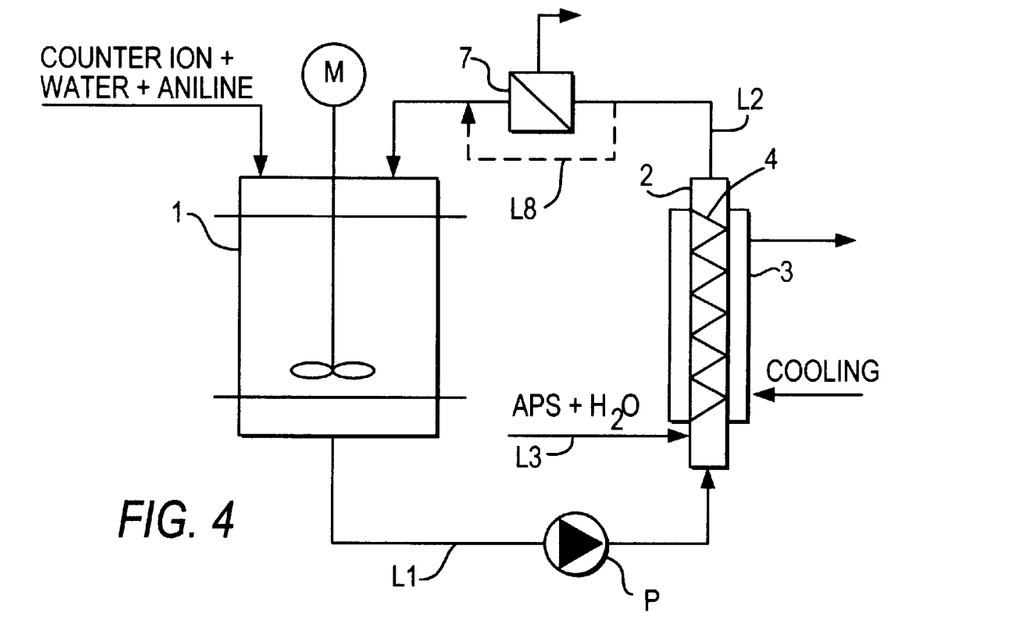
FIG. 4 shows an industrial application according to a fourth embodiment of the invention.

FIG. 4 shows yet another alternative which is primarily a modification of the process of FIG. 1. Here the supply of the reactants is continuous, and the process is a semi-batch type or a continuous process depending on whether substances not participating in the reaction are continuously taken away. The circulation of the polymerizing agent, the reactants therein and the final product is implemented in the same way as in FIG. 1, but the return line L2 comprises continuous separation 7 of solid polymer for example by filtering, wherein the reactants dissolved in the polymerizing agent and soluble aniline oligomers not yet separated circulate between the mixing tank 1 and the tubular reactor 2. In the figure, broken lines illustrate a bypass line L8 on the return line 12, whereby polymer separation can be bypassed. If necessary, the circulation also comprises water separation. By adjusting the ratio between the flow through the separation and the bypass flow, it is possible to affect the ratio between the oligomer and the polymer in the polymerization medium.

In all of the above-mentioned embodiments, it is possible to have several tubular reactors 2 equipped with static mixers in parallel, wherein the capacity can be increased. In view of controlling the reaction conditions, it is also advantageous to use several smaller reactors with a small cross-sectional area in parallel, instead of one large reactor. Furthermore, it is possible to have two or more tubular reactors in series, wherein an intermediate container may be provided between two consecutive tubular reactors to level the concentrations. There may naturally be such series of tubular reactors and intermediate containers in parallel.

Figure 17:
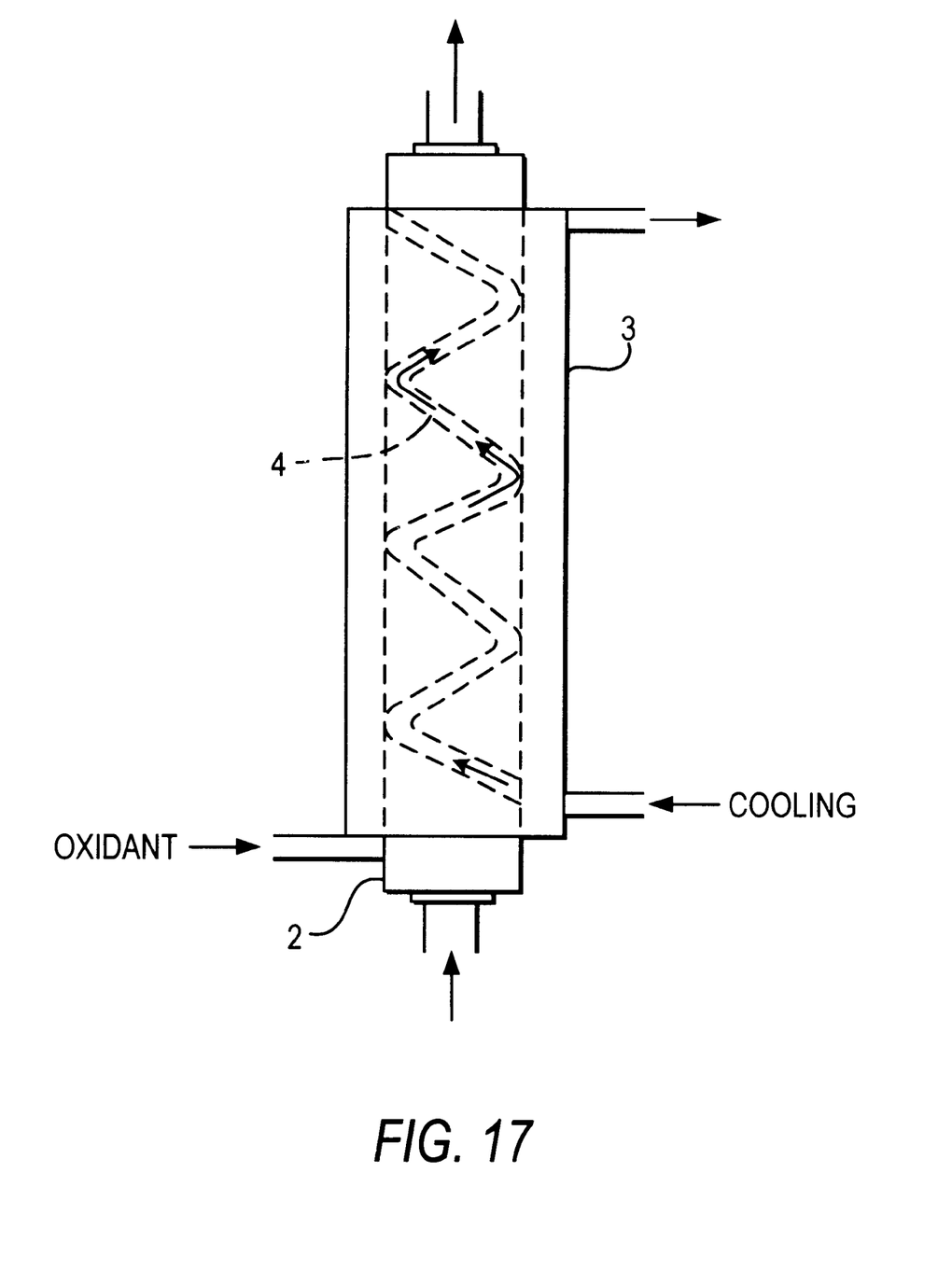
FIG. 17 shows one embodiment of a tubular reactor in side view.

Further, the reactor have static mixers which at the same time act as heat transfer surfaces. FIG. 17 shows a tubular reactor 2 where the cooling agent is also led to a heat transfer conduit system inside the reactor, in addition to being led to the cooling jacket 3. The heat transfer conduits can extend across the flow of the reaction medium and cause mixing on the same principle as static mixers, at the same time as they cause the cooling of the medium. The heat transfer conduits can be designed to have the external shape and position typical of static mixers. The tubular reactor 2 may have both static mixers 4 without the cooling agent flow and static mixers 4 with the cooling agent flow. The tubular reactor shown in FIG. 17 can be used in all embodiments shown in FIGS. 1 to 4.

The invention is not limited solely to the above-mentioned reactants (acid and oxidant), but it is also possible to use other reactants in all the processes presented in the FIGS. 1 to 4.

In an aqueous polymerization medium, several protonic acids or mixtures thereof are feasible. Protonic acids which can be used to form a complex with the aniline monomer and to make it possible for the aniline monomer to be dissolved in water, include hydrochloric acid, hydrogen bromide, sulfuric acid, perchloric acid, nitric acid, phosphoric acid, phosphonic acid, methanesulphonic acid, trifluoromethanesulphonic acid, toluenesulphonic acid, dodecylbenzenesulphonic acid (DBSA), acetic acid, trichloroacetic acid, trfluoroacetic acid, and formic acid. It is also possible to use a mixture of these protonic acids. Also Lewis acids can be used. The invention is not limited to the use of the above-mentioned acids.

Furthermore, several known oxidants can be used in polymerizing aniline. Oxidants which can be used for oxidative polymerization of aniline monomers include ammonium persulfate, $K_2Cr_2O_7$, $KIO_3$, $FeCl_3$, $KMnO_4$, $KBrO_3$, $KClO_3$ peracetic acid or hydrogen peroxide.

Particularly advantageous oxidants are peroxide compounds, particularly peracetic acid or hydrogen peroxide which are effective but have been considered dangerous.

The peracetic acid and hydrogen peroxide are reactive but their use has been previously limited by the uncontrollability of the conditions. In connection with these oxidants, a suitable catalyst is used which can be supplied into the tubular reactor in the same flow with the oxidant or separately so that a catalytically effective quantity of it is provided in the reaction medium.

Further, the term aniline comprises in this context also substituted anilines.

The polymerization can be effected at a desired temperature, which can be adjusted by means of the cooling system. In some cases it may be desirable to conduct the polymerization at a temperature higher than the ambient temperature. For example a suitable temperature can be selected from the range of −25° C. to +70° C. Low temperatures below zero Celsius can be attained by using, in addition to the monomer, oxidant, acid and possible other constituents, an agent that acts as freezing point depressant for the polymerization medium. To act as a freezing point depressant, the agent must be soluble in the liquid phase of the polymerization medium used. When the freezing point of water used as the polymerization medium is to be lowered, the freezing point depressant can be selected among water-soluble organic compounds or inorganic salts. Examples of suitable organic compounds are methanol and ethanol, and examples of inorganic salts are sodium chloride and potassium chloride. The freezing point depressant can be introduced in the mixing tank 1 or at any point before the tubular reactor 2, provided that it will be dissolved to the required concentration to lower the freezing point.

Also, an aqueous polymerization medium is not the only agent feasible for use as a carrier for dissolving reactants and carrying produced polymer particles, even though water is an inexpensive and safe process medium for this purpose. Also organic media are feasible, if the nature of the reactants requires organic solvents. Feasible organic media include e.g toluene, methanol or ethanol. The low polymerization temperature, e.g. below zero, can be attained by choosing an organic medium whose freezing point is below zero Celsius. The freezing points of the three above-mentioned substances are far below zero Celsius.

The invention is also not limited to the presented method of polymerization, but also emulsion polymerization is possible.

Similarly, the invention is not limited to the use of static mixers in the tubular reactor, but also dynamic mixers can be used, which can be of rotor/stator type.

In the following, tests performed on the invention will be described. The tests should not be interpreted to restrict the invention.

1. Analysis of Samples

By using a device constructed for the purpose, the quality and properties of the produced polyaniline were determined with respect to three different factors, which were degree of oxidation, particle size distribution, and so-called intrinsic viscosity of the polymers.

The analysis of the product was not performed directly on the final product obtained from the semi-batch reactor, but the separated solid matter was subjected to an ion exchange process in which the polyaniline salt form produced in the reactor was converted to a so-called polyaniline emeraldine base (EB) by dedoping.

The aftertreatment process was the following: After polymerization, the solid matter (200 to 400 g) filtered out from the mother liquor was dissolved in 25 wt-% ammonia solution (1400 ml) in which it was allowed to react overnight under intensive agitation. After the ion exchange, the polyaniline was washed with water to remove ammonium sulfate produced in the ion exchange process from the polymer. After the washing with water, an alcohol washing was performed with etanol or methanol to remove possible by-products and water bound in the solid matter. After this multi-step ion exchange and washing process, the resulting polyaniline EB form was dried in a vacuum at a temperature of 42° C., and after drying, the sample was ready for analysis.

1.1 Degree of Oxidation

To determine the degree of oxidation of the polyaniline, an infrared range adsorption spectrum of the produced polyaniline was measured in a wave number range from 4000 to 400 1/cm, where the degree of oxidation was calculated on the basis of the ratio of heights of peaks present around the wave number ranges of 1575 to 1600 1/cm and 1500 to 1520 1/cm. For example, Asturias and MacDiarmid (G. E. Asturias, A. G. MacDiarmid, The oxidation state of the "Emeraldine" base, Synthetic Metals, 29 (1989), E157-E162) have demonstrated a correlation between said absorption peaks and the degree of oxidation of polyaniline.

To perform a FT-lr analysis, a KBr tablet of 0.3 wt-% was made of the sample to be examined, by weighing 0.003 g of polyaniline and 0.100 g of potassium bromide, by griding the obtained mixture in a mortar to homogenize it, and by compressing a tablet of the KBr polymer powder under a pressure of 8 bar.

1.2 Particle Size Distribution

The particle size distribution of polyaniline suspended in water was determined with a Coulter LS 130 device. 5 grams of polyaniline EB form was suspended in 40 ml of water, after which a required quantity, determined by the device, of the suspension was fed into the device. Before taking the actual measurement, the sample was bombarded with ultrasound for 15 seconds to break possible agglomerates. Of the measurement results, the particle size distribution was computed with a program supplied by the device manufacturer, applying Fraunhofer's mathematical model to determine the real distribution from the measurements taken by the device. A particle size distribution based on volume is illustrated in the figures, and an average size is given in the following examples on the basis of the volume-average distribution.

1.3 Intrinsic Viscosity

Intrinsic viscosity was determined with an Ubbelohde capillary viscometer of IIc class. Said device is used to measure the efflux time of the tested solution through a capillary tube at a constant temperature. The mixture to be analyzed was prepared by dissolving 0.063 g of EB powder in 35 ml of 96–98 % sulfuric acid of pro analysis quality; the concentration of the solution prepared in this way was thus approximately 0.1 weight-% in relation to the polymer.

To determine the intrinsic viscosity, one must determine the specific viscosity of the polymer, which is obtained by formula (1)

$$\eta_{sp} = \frac{(\eta - \eta_0)}{\eta_0} \cong \frac{(t - t_0)}{t_0} \qquad (1)$$

in which $\eta_o$ viscosity of the solvent, $\eta$ viscosity of the solution, $t_o$ efflux time measured for the solvent in the viscometer, $t$ efflux time measured for the solution in the viscometer.

For analysis of the samples, the method for determining a one point limiting viscosity number presented by Solomon and Cuitan was used (O. F. Solomon, I. Z. Cuita, Determination de la viscosite intrinseque de solutions de polymers par une simple determination de la viscosite, Journal of Applied Polymer Science, VI (1962), 24, 683–686). The method is based on the following formula $$[\eta] = \frac{1}{c} \cdot \sqrt{2 \cdot (\eta_{sp} - \ln \eta_r)} \quad (2)$$

in which $\eta_{sp}$ is derived from the formula (1).

The term $\eta_r$ in the formula refers to the viscosity ratio of the polymer solution, and it is defined in the following way:

$$\eta_r = \frac{\eta}{\eta_0} \cong \frac{t}{t_0} \quad (3)$$

The unit of concentration c is g/dl, i.e. 9/100 ml, for which reason the unit of limiting viscosity numbers obtained by the formula (2) is dl/g.

In all the examples, a tubular reactor 2 is used, whose length is 3.0 m and diameter 10 mm. The linear flow rate in the reactor is 0.3 m/s in all the examples. The tubular reactor was equipped with static mixers of the SMXL type (Sulzer Chemtech GmbH).

Figure 5:
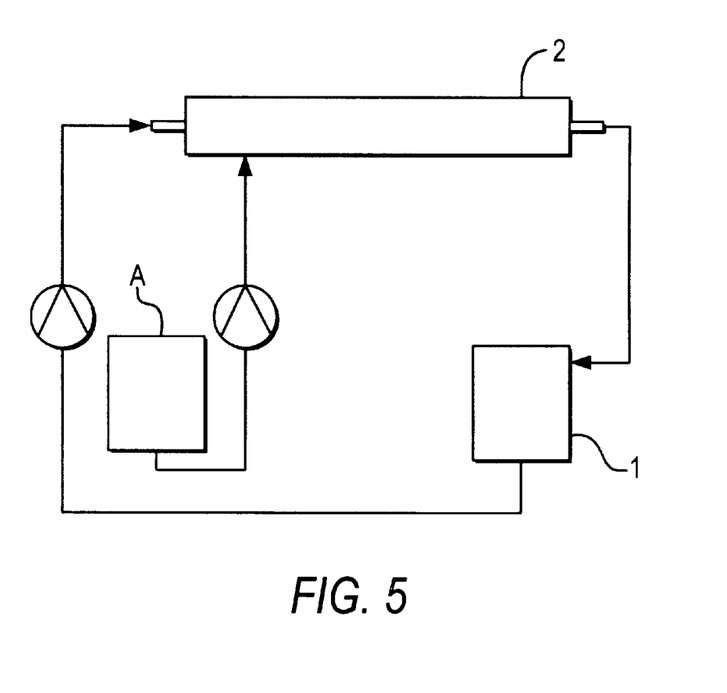
FIG. 5 illustrates test arrangements of tests made on the invention.

The polymerization of aniline in the tubular reactor was examined with a process presented in FIG. 5. An oxidant was pumped from a container A and a monomer-acid-water mixture from a tank 1 to the tubular reactor 2 by simultaneously circulating the solution discharged from the reactor 2 via the tank 1 and by supplying oxidant into the circulation system. In the tests carried out, the effect of the concentration and feeding rate of the oxidant and the starting temperature of the polymerization on the final product of the process was examined. The parameters of the test series are presented in Table I.

TABLE I

Polymerization of aniline in a tubular reactor. Variables of the test series in different test runs.

| Test | weight-% % | p(Ox) dm³/h | $T_s$ C | $t_p$(Ox) min |
|---|---|---|---|---|
| 1 | 35 | 10 | 4 | 15 |
| 2 | 35 | 10 | 15 | 15 |
| 3 | 20 | 15 | 4 | 22 |
| 4 | 20 | 15 | 15 | 22 |
| 5 | 20 | 10 | 4 | 33 |
| 6 | 20 | 10 | 15 | 33 |

In the table, the markings indicate the following:

| | |
|---|---|
| weight-% | concentration of the oxidant fed into the reactor in weight percent, |
| p(Ox) | feeding rate of the oxidant, |
| $T_s$ | starting temperature of the polymerization reaction, and |
| $t_p$(Ox) | period of feeding of the oxidant. |

In all the tests in the series, the composition of the starting batch of the monomer was kept constant. Polymerization was interrupted by turning off the feeding of the oxidant after the total molar quantity fed into the process was 1.25 times the initial molar quantity of aniline. Ammonium peroxosulfate was used as the oxidant.

The reactor apparatus was cooled with a cooling liquid circulating in the reactor jacket.

The following examples illustrate different combinations of tests of table 1.

EXAMPLE 1

Figure 6:
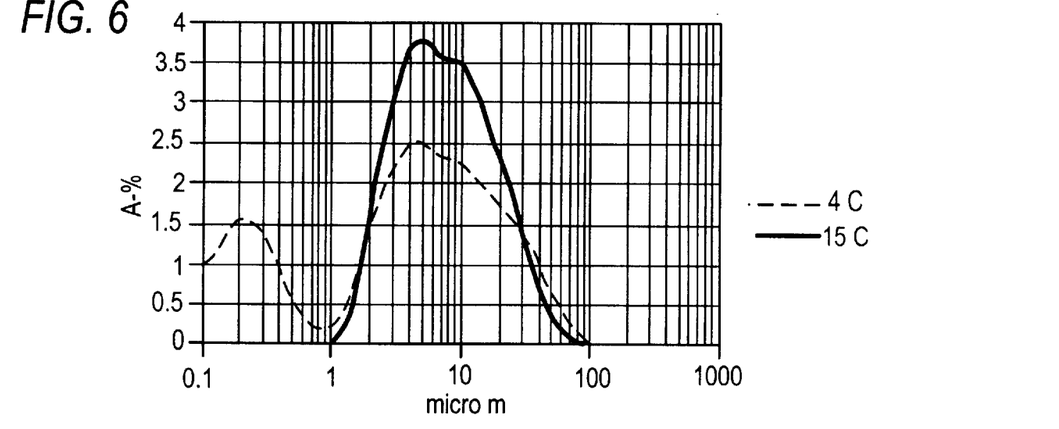
FIGS. 6 to 16 show the test results.
Figure 7:
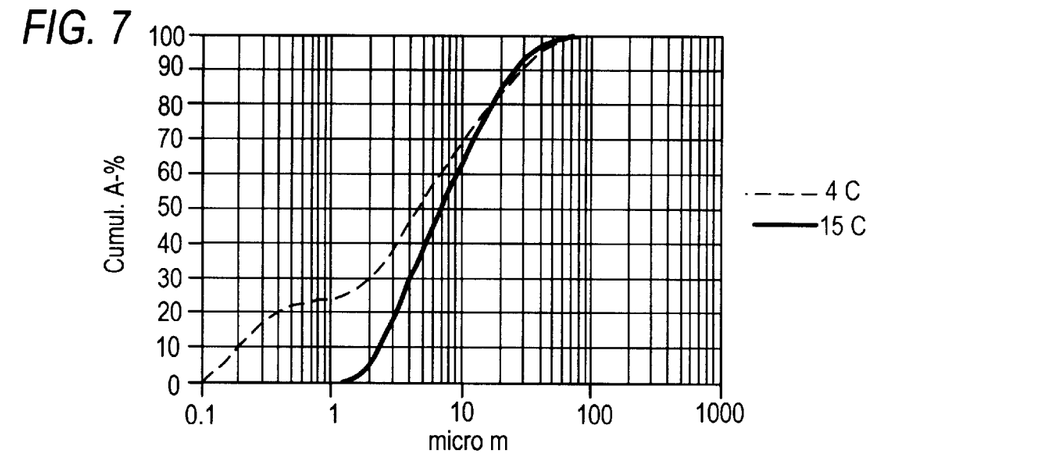

Effect of Initial Temperature Level at Starting of Polymerization on the Product An oxidant with concentration of 20 weight percent was fed into the described process at a rate of 15 dm³/h as shown in Table I. Depending on the test, the polymerization of aniline was started at two different temperatures, 4° C. and 15° C. The effect of the conditions on the area-average particle size distribution of solid particles is shown in FIG. 6. FIG. 7 shows the corresponding cumulative size distribution.

It can be seen from FIGS. 6 and 7 that the share of small polymer particles can be increased by reducing the initial temperature level of polymerization. On the other hand, the share of large particles can be increased by raising the Initial temperature, and this is shown in the results as a narrowing of the distribution. Thus, the share of small particles of the total surface area is increased as the temperature at which the polymerization is started is lowered.

Figure 8:
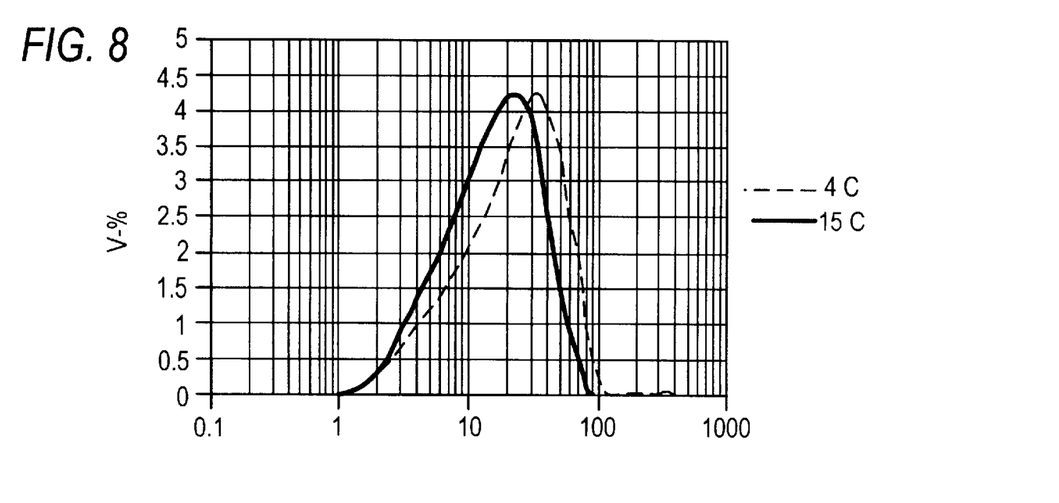
Figure 9:
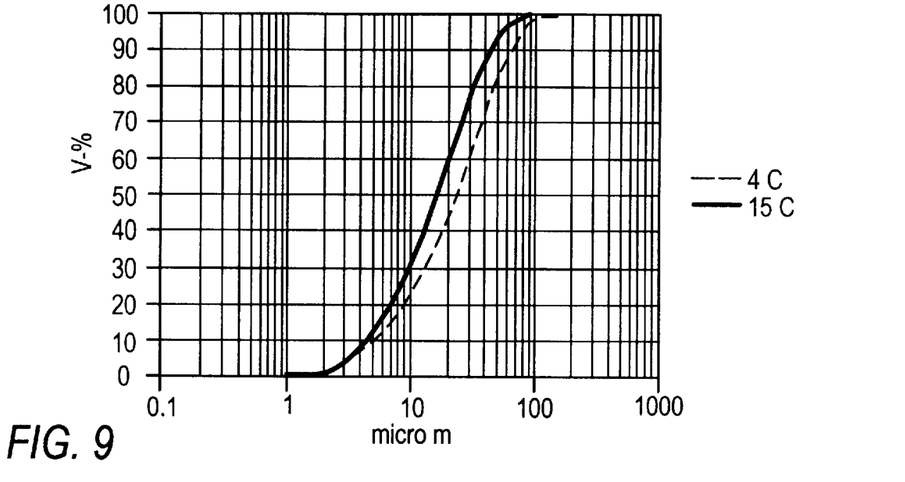

FIG. 8 shows a volume-average particle size distribution of the above-mentioned tests, and FIG. 9 shows the corresponding cumulative volume-average particle size distribution. It can be seen from FIGS. 8 and 9 that contrary to the case of area-average size distribution, when looking into the volume-average particle size distribution, the share of large particles is increased when the initial temperature level is lowered.

EXAMPLE 2

Effect of the Feeding Rate of the Oxidant on the Product

An oxidant with a concentration of 20 weight percent was fed into the described semi-batch process at rates 10 and 15 dm³/h according to Table I. The polymerization of aniline was started, depending on the test, at two different temperatures, 4° C. and 15° C.

Figure 10:
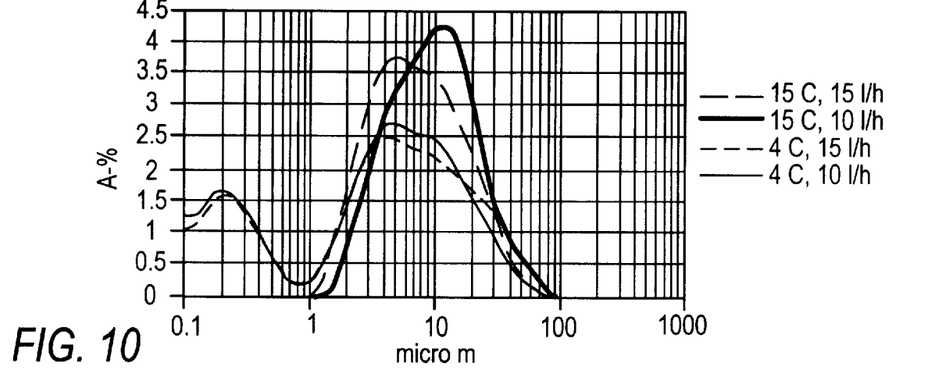
Figure 11:
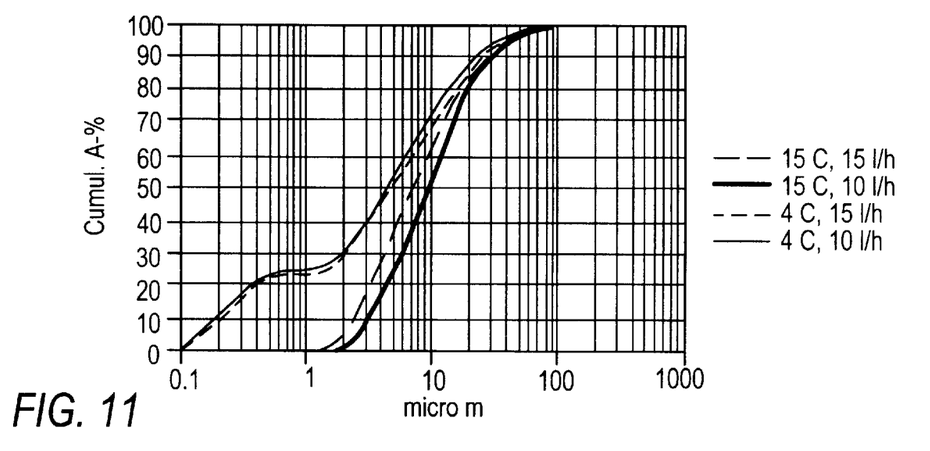

The effect of the conditions on the area-average particle size distribution of the solid particles is presented in FIG. 10. FIG. 11 shows the corresponding cumulative size distribution.

It can be seen from FIGS. 10 and 11 that at low temperatures of polymerization starting, the effect of the feeding rate of the oxidant is not as great as at temperatures of 15° C. In fact, the effect of the feeding rate is reversed when the temperature is reduced. It can be seen from the figures that at a temperature level of 15° C., an increase in the feeding of the oxidant will increase the share of small-size particles in the total surface area. On the other hand, the distribution can be narrowed by feeding the oxidant at a rate of 10 l/h instead of 15 l/h.

Another finding related to the distributions is that the effect of the feeding rate of the oxidant at 4° C. is insignificant when compared to a higher temperature level. It can be seen from FIG. 10 that at a low temperature, particles with a diameter of less than 1 μm are formed and, on the other hand, that at a high temperature, these particles are not formed, irrespective of the feeding rate of the oxidant.

Figure 12:
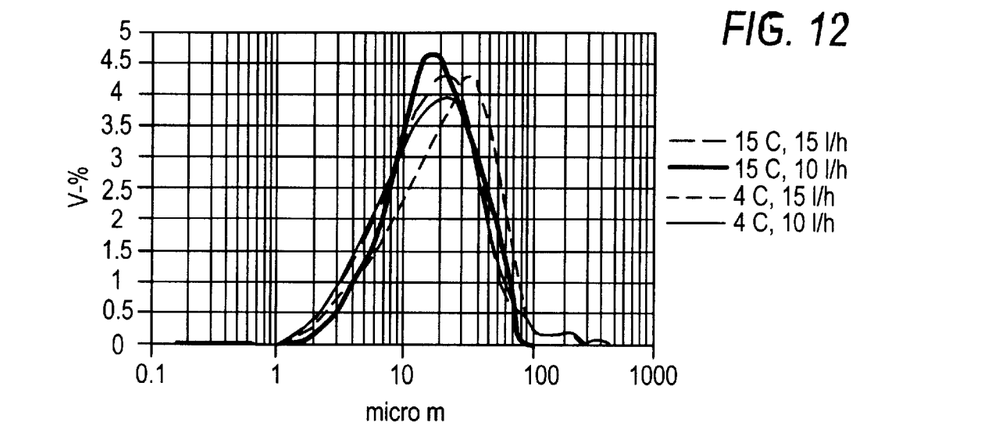

FIG. 12 shows the volume-average particle size distributions of the tests shown in FIGS. 10 and 11. It can be seen from FIG. 12 that the effect of the temperature level and the feeding rate of the oxidant on the form of the volume-average particle size distribution is not as clear as on the distribution Known in FIG. 10. Of the effect of the examined variables on the volume-average particle size distribution, it can only be stated that a product with the widest distribution is obtained when the polymerization is performed at a temperature of 4° C. and the oxidant is fed at a rate of 10 l/h.

EXAMPLE 3
Effect of Concentration of the Supplied Oxidant on the Product

An oxidant with a concentration of 20 and 35 weight percent was supplied into the semi-batch process according to Table I at a rate of 10 l/h. The polymerization of aniline was started at the temperature of 15° C. The effect of the conditions on the area-average particle size distribution of solid particles is presented in FIG. 13. FIG. 14 shows the corresponding cumulative distribution. It can be seen from FIGS. 13 and 14 that at the temperature level of the tests, the effect of the concentration of the oxidant is the following. Supplying a concentrated oxidant will considerably increase the share of small particles and thereby reduce the average particle size ($d_{50}$) and widen the distribution.

Figure 13:
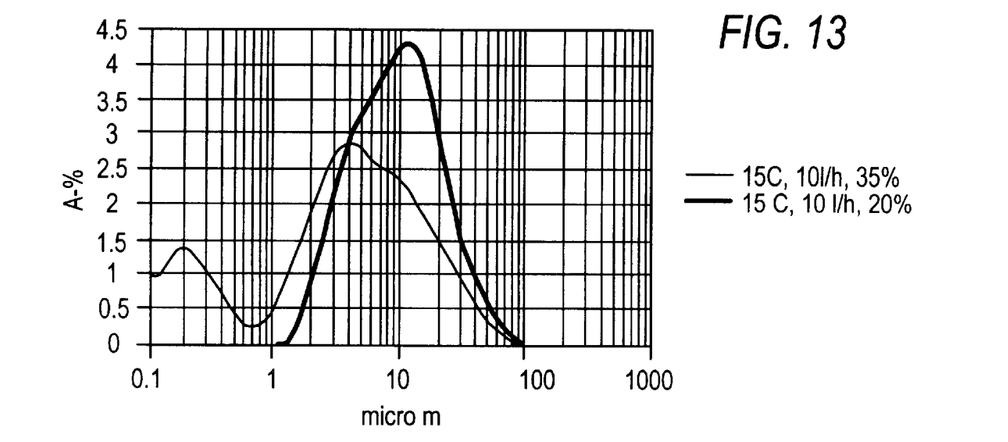
Figure 14:
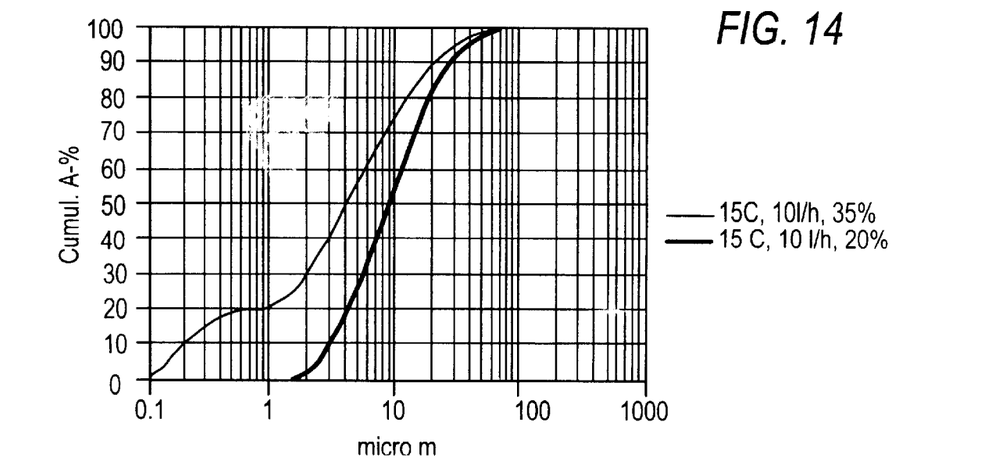
Figure 15:
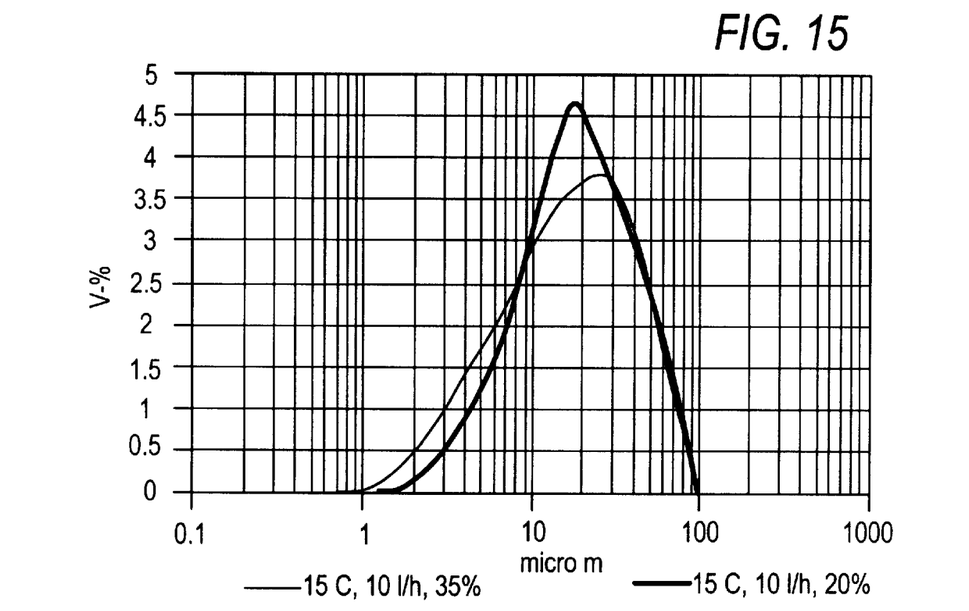

FIG. 15 shows the volume average particle size distributions of the tests corresponding to FIG. 13. It can be seen from FIG. 15 that also the volume average particle size distribution is narrower at a lower feeding rate of the oxidant.

Figure 16:
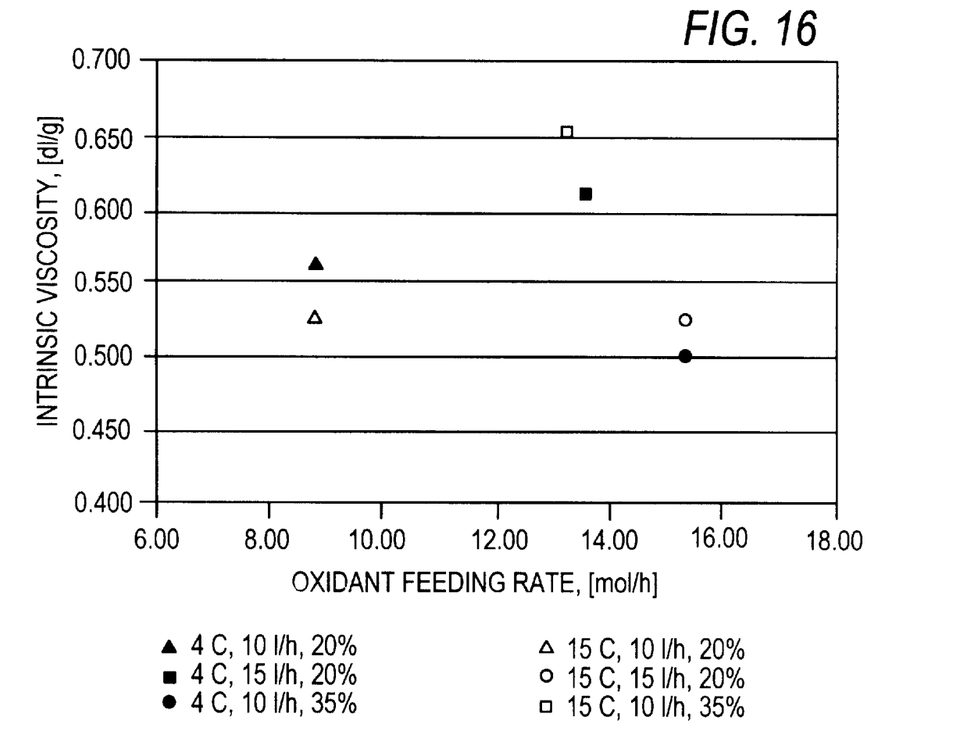

EXAMPLE 4
Effect of Polymerization Conditions on the Molar Mass of the Product It can be seen from FIG. 16 that the limiting viscosity number measured for the product changes in dependence of the initial temperature level of the polymerization reaction and the feeding rate of the oxidant. Since the limiting viscosity number is known to describe the average molar mass of the polymer, on the basis of FIG. 16 it can be shown that the molar mass of the product can be adjusted by varying the initial temperature level and the feeding rate of the oxidant.

The invention is not limited to the embodiments shown hereinabove, but it can be modified within the scope of the invention presented by the accompanying claims.

We claim:

1. A method for preparing polyaniline, in which aniline is polymerized in a reactor in a polymerization medium containing aniline and oxidant, in that the polymerization being performed in a reactor in which the ratio of the heat transfer surface to the reaction volume is at least 10/m.

2. The method according to claim 1, wherein the polymerization is performed in a tubular reactor by allowing a medium containing aniline and oxidant to flow in a mixed flow through the tubular reactor.

3. The method according to claim 2, wherein the mixing in the tubular reactor is implemented with static mixers.

4. The method according to claim 2, wherein the polymerization is a continuous process.

5. The method according to claim 2, wherein the polymerization is a batch process, the medium circulating several times through the same tubular reactor in a circulation flow.

6. The method according to claim 5, wherein polyaniline is continuously separated from the circulation flow of the medium.

7. The method according to claim 1, wherein the temperature of the polymerization medium within the reactor is in the range of from −25° C. to 70° C.

8. The method according to claim 7, wherein the temperature of the polymerization medium within the reactor is below 0° C.

9. The method according to claim 8, wherein freezing point depressants are used in an aqueous polymerization medium.

10. The method according to claim 2 wherein the medium is allowed to flow simultaneously through two or several tubular reactors connected in parallel.

11. The method according to claim 2 wherein the oxidant is introduced as a separate flow to the initial end of the tubular reactor.

12. The method according to claim 11, wherein the oxidant is introduced in the tubular reactor at different locations in the direction of flow of the medium.

13. The method according to claim 1, wherein the oxidant is a peroxy compound.

14. The method according to claim 11, wherein the oxidant is a peroxy compound.

15. The, method according to claim 12, wherein the oxidant is a peroxy compound.

16. The method according to claim 1, wherein said ratio is at least 20/m.

17. The method according to claim 16, wherein the polymerization is performed in a tubular reactor by allowing a medium containing aniline and oxidant to flow in a mixed flow through the tubular reactor.

18. The method according to claim 17, wherein the oxidant is introduced as a separate flow to the initial end of the tubular reactor.

19. The method according claim 18, wherein the oxidant is introduced in the tubular reactor at different locations in the direction of flow of the medium.

20. The method according to claim 1, wherein the oxidant is preacetic acid or hydrogen peroxide.

21. The method according to claim 11, wherein the oxidant is preacetic acid or hydrogen peroxide.

22. The method according to claim 12, wherein the oxidant is preacetic acid or hydrogen peroxide.

23. The method according to claim 16, wherein the oxidant is peroxy compound.

24. The method according to claim 18, wherein te oxidant is peroxy compound.

25. The method according to claim 19, wherein the oxidant is peroxy compound.

26. The method according to claim 23, wherein the oxidant is preacetic acid or hydrogen peroxide.

27. The method according to claim 24, wherein the oxidant is preacetic acid or hydrogen peroxide.

28. The method according to claim 25, wherein the oxidant is preacetic acid or hydrogen peroxide.

* * * * *